US010600228B1

(12) United States Patent
Sasikumar et al.

(10) Patent No.: US 10,600,228 B1
(45) Date of Patent: Mar. 24, 2020

(54) AUTOMATIC AND INTERACTIVE ANIMATION DRIVEN BY CHANGE-BASED HEURISTICS

(71) Applicant: ADOBE INC., San Jose, CA (US)

(72) Inventors: Anirudh Sasikumar, Dublin, CA (US); Alexander Poterek, Oakland, CA (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/159,672

(22) Filed: Oct. 14, 2018

(51) Int. Cl.
*G06T 13/80* (2011.01)

(52) U.S. Cl.
CPC .................... *G06T 13/80* (2013.01)

(58) Field of Classification Search
None
See application file for complete search history.

(56) References Cited

U.S. PATENT DOCUMENTS

2010/0064223 A1* 3/2010 Tilton .................... G06T 13/80
715/732

OTHER PUBLICATIONS

Alexander Kort, "Computer Aided Inbetweening", Jun. 5, 2002, ACM, NPAR '02 Proceedings of the 2nd international symposium on Non-photorealistic animation and rendering, pp. 125-132.*

Konstantin Melikhov, Feng Tian, Hock Soon Seah, Quan Chen, Jie Qiu, "Frame Skeleton Based Auto-Inbetweening in Computer Assisted Cel Animation", Nov. 20, 2004, IEEE, 2004 International Conference on Cyberworlds.*

Jun Yu, Dongquan Liu, Dacheng Tao, Hock Soon Seah, "Complex Object Correspondence Construction in Two-Dimensional Animation", May 31, 2011, IEEE Transactions on Image Processing, vol. 20, Issue 11, pp. 3257-3269.*

Leonardo Carvalho, Ricardo Marroquim, Emilio Vital Brazil, "DiLight: Digital light table—Inbetweening for 2D animations using guidelines", Jun. 2017, Elsevier, Computers & Graphics, vol. 65, pp. 31-44.*

* cited by examiner

*Primary Examiner* — Robert Bader
(74) *Attorney, Agent, or Firm* — Finch & Maloney PLLC

(57) ABSTRACT

Techniques for performing automatic interactive animation by automatically matching objects between multiple artboards, allowing an animator to link multiple artboards in a temporal sequence using time as a trigger and allowing an animator to preview an animation using intuitive drag controls via an input device such as a mouse or touch screen. An automatic animation process is performed by matching objects/nodes between artboards by determining a ranking of similarity between objects based upon a distance metric computed for a set of one or more attributes associated with each object in the artboards. If sufficient match is found, the matched objects can be treated as a single entity to be animated. In another embodiment, dominant direction of movement with respect to the matched objects is determined, and receipt of a drag event (mouse input or touch screen gesture input) in said dominant direction causes a preview of animation of that entity.

10 Claims, 16 Drawing Sheets

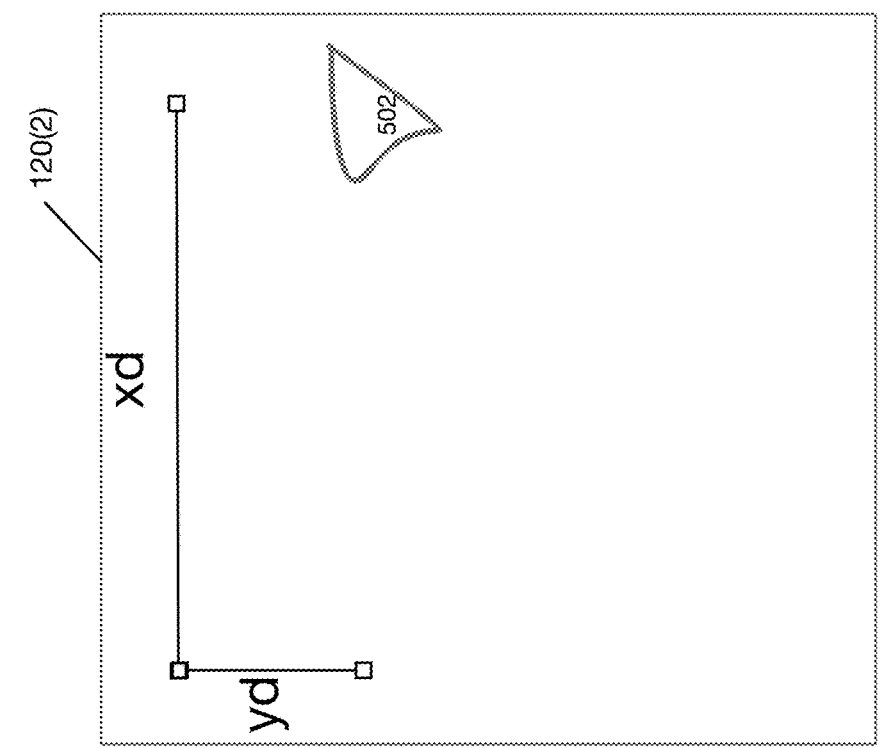
FIG. 6a
$$|dx| > |dy| \rightarrow d = |dx|$$
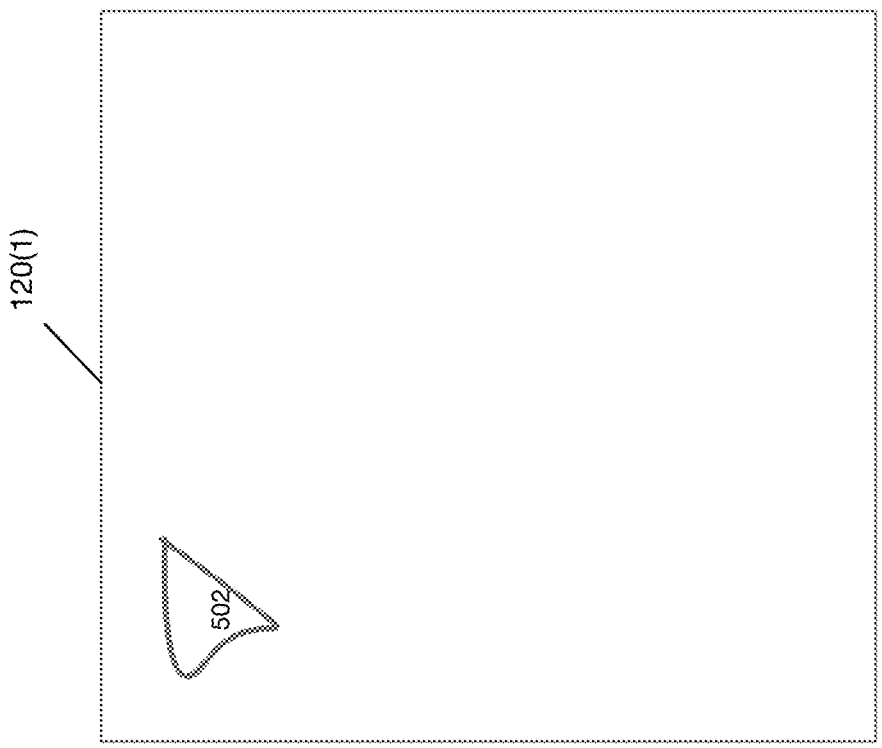

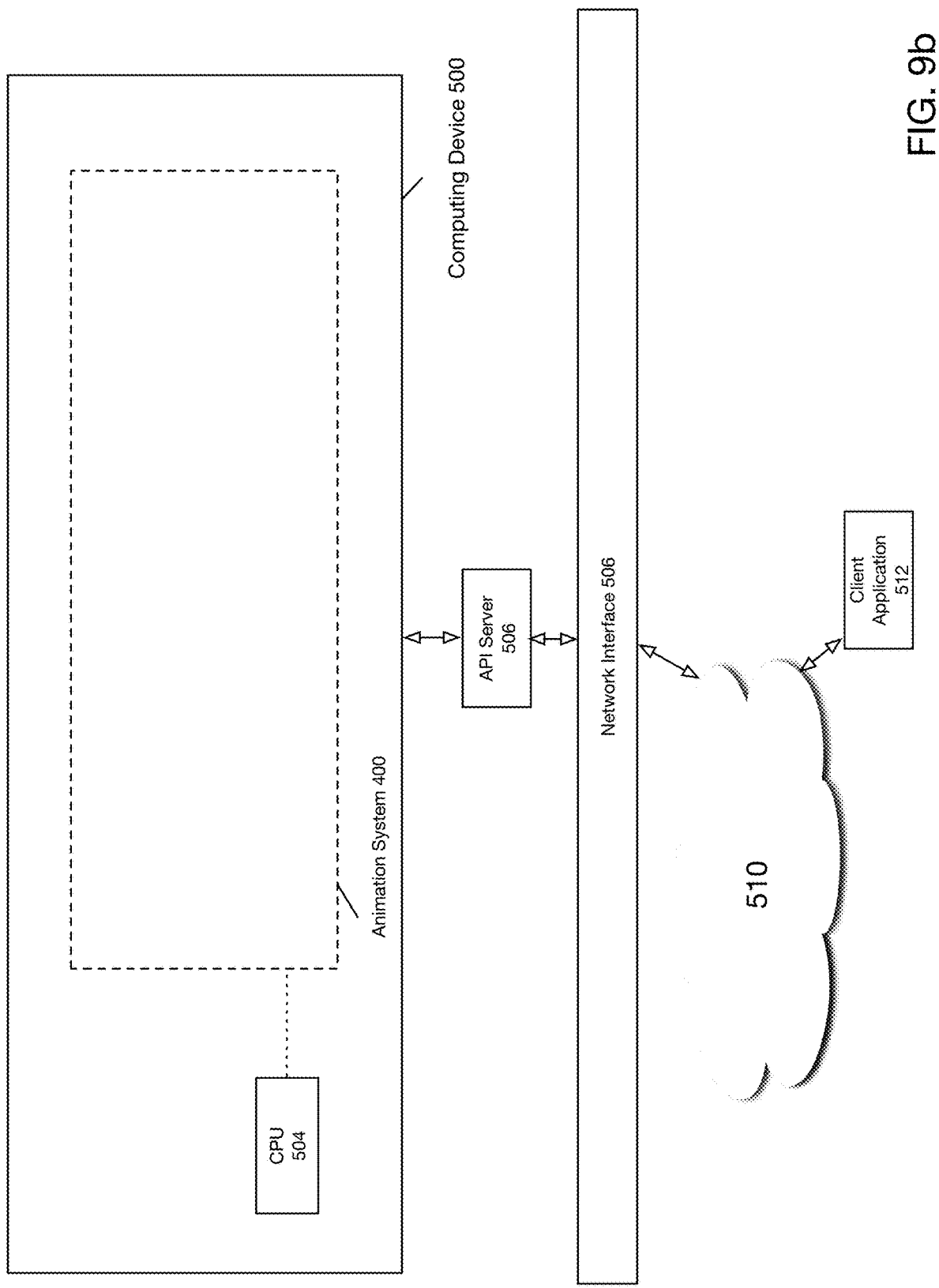

US 10,600,228 B1

AUTOMATIC AND INTERACTIVE ANIMATION DRIVEN BY CHANGE-BASED HEURISTICS

FIELD OF THE DISCLOSURE

This disclosure relates to techniques for performing digital animation. In particular, this disclosure relates to techniques for performing automatic interactive animation by automatically matching objects between multiple artboards, allowing an animator to link multiple artboards in a temporal sequence using time as a trigger and allowing an animator to preview an animation using drag controls via an input device such as a mouse or a touch screen.

BACKGROUND

Authoring animations seen in mobile and web application is unintuitive for visual designers who have not specialized in animation. Designing animations triggered by interactions like dragging and swiping are complex to author and require designers to understand concepts that are very developer oriented. In more detail, to perform animation across one or more canvases, the same objects in each canvas need to be explicitly associated with one another. In order to achieve this, objects from one scene must be matched with the same objects in another scene in an automated fashion. For example, an artboard may comprise any number of child objects such as shapes or images. The same objects may appear in a second artboard in which case an animation algorithm animates the matching objects from their respective positions in the first artboard to their positions in the second artboard. Typically objects in an artboard are associated with various attributes such as a name, type, etc. Matching objects from one artboard to another may be achieved by finding objects in two artboards sharing the same name and type. However, performing this matching in an automated fashion can be problematic when, for example, duplicate object names exist across artboards.

Once an animation has been designed by developing multiple artboards, designers typically would like to preview the animation. However, known techniques for designing an animation typically require designers/animators to input a drag direction (like left, top, right, bottom) in addition to a gesture, which is inconvenient. Further, such known techniques are generally limited in the types of animations they can generate. Other known techniques employ simplistic auto-animation techniques such as the concept of "Magic Move" that animates objects from one slide to the other. However, complex interactions like drag do not exist with these known methods.

Other tools employ a "timeline" and a single canvas in which artwork is shown. The user is required to specify a number of choices in a timeline UI to animate a property. Requiring the user to select and specify a large number of properties tends to be inconvenient and often impractical.

BRIEF DESCRIPTION OF THE DRAWINGS

FIG. 6a depicts an example operation of a drag heuristics process according to one embodiment of the present disclosure.

FIG. 9b illustrates an example integration of an animation system into a network environment according to one embodiment of the present disclosure.

DETAILED DESCRIPTION

Figure 1A:
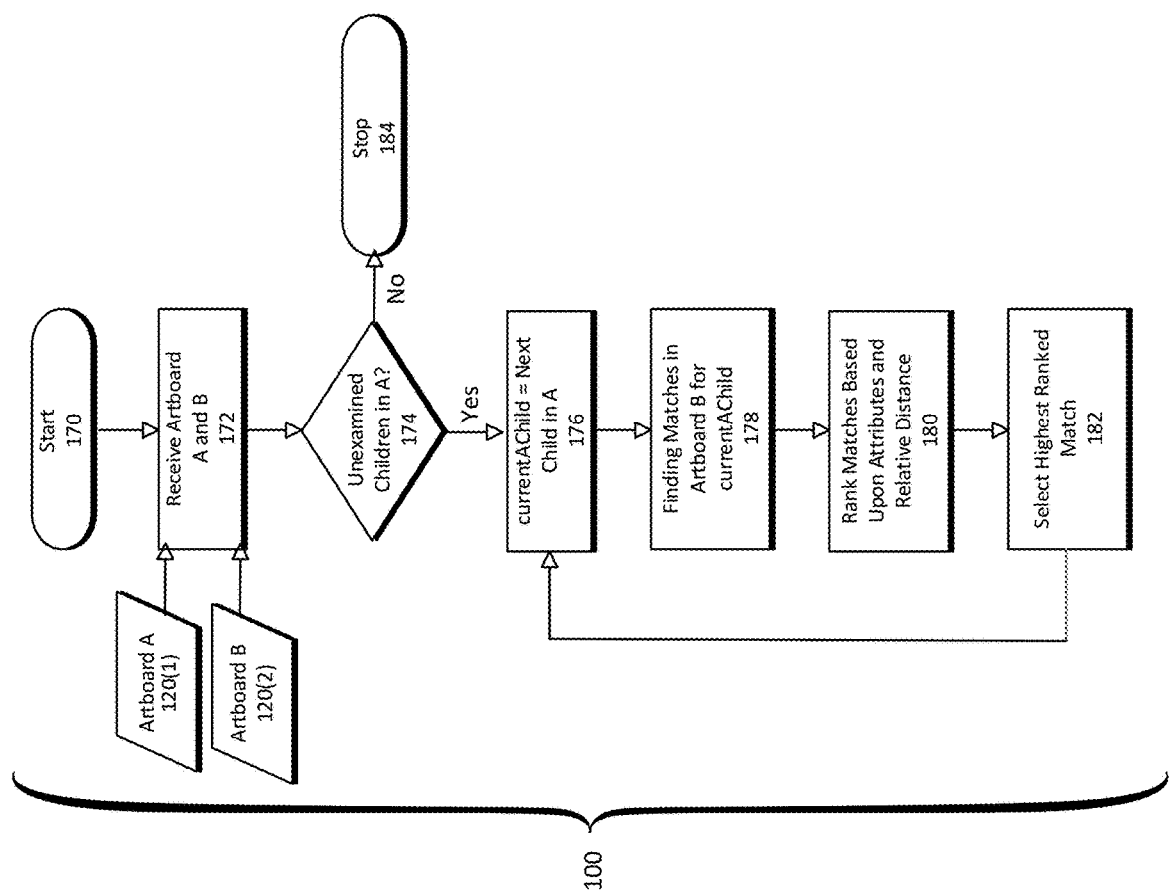
FIG. 1a is a flowchart of an animation shape matching process according to one embodiment of the present disclosure.

Techniques are disclosed for performing an automatic animation between two or more artboards. In an embodiment, as part of an automatic animation, a matching process is carried out to associate objects between one artboard and another. This matching process includes the identification of duplicate objects, which all may share a common attribute or set of attributes, and identification of the real match (based on some matching threshold or criteria). In one such embodiment, an automatic animation process is performed by matching objects/nodes between artboards by determining a ranking of similarity between objects based upon a distance metric computed for a set of attributes associated with each object in the artboards. According to one such embodiment, an optimal or otherwise sufficient match is determined using one or more distance metrics between objects in a first artboard and a second artboard. Among other distance metrics, a distance between two objects may be determined based upon the relative number of layers separating the objects. Another example distance metric is the number of properties or attributes (of the objects being compared) that are similar. The following example property values may be compared: object position (e.g., position within an artboard and/or within a layer hierarchy), object size, fill color associated with object, stroke color associated with object, visibility of object (e.g., unhidden, partially hidden, completely hidden), corner radius or other unique geometric quality associated with object, line height or pitch associated with object, character spacing associated with object, and font type and/or size associated with object, to name a few.

In addition, techniques for previewing an animation are disclosed. In particular, once an animation design has been completed, an animator may desire to have the preview of the animation to be driven interactively via input from mouse or keyboard or touch screen. However, generating an appropriate control interface for previewing an arbitrary animation may be difficult as the trajectory of individual animated objects may vary. Thus, according to one embodiment of the present disclosure, a previewing technique referred to herein as drag heuristics is employed. A drag heuristics process attempts to determine a dominant direction in which one or more objects/shapes move between two artboards. The dominant direction can then be used as the trajectory of an individual animated object, which in turn can be used to generate an intuitive or otherwise appropriate control interface for previewing the animation of that object.

In addition, techniques for linking multiple artboards together in a seamless fashion to generate a single animation are described. According to one embodiment, a graphical user interface ("GUI") allows a designer to work with multiple artboards and link them together in a graphical fashion. The GUI performs analytics on the underlying objects within each artboard with respect to their matching between adjacent artboards and provides graphical and other design aids to facilitate the generation of an animation from multiple artboards.

Definitions

Artboard: In addition to its plain and ordinary meaning, an artboard as used herein refers to a digital canvas upon which an illustrator, artist, animator, etc. may draw or represent objects to be animated such as shapes, images or any other graphics.

Object/Node: In addition to its plain or ordinary meaning, a node or object refers to any entity that may be associated with an artboard including actual shapes or images that are to be animated, including a logical entity such as a group that operates as a logical container to represent a hierarchical or other relationship between shapes making up a given entity, or other groups. For purposes of the present disclosure, the terms node and object may be used interchangeably and effectively refer to any entities that may be associated with a canvas or artboard.

Layer: In addition to its plain or ordinary meaning, a layer is a logical construct representing an ordering of shapes or groups in an imagined z dimension perpendicular to a 2-D screen or image. That is, a layer represents a virtual ordering of shapes or groups in a dimension perpendicular to an image ('z' dimension). It will be understood that when rendering an artboard, certain shapes may occlude others depending upon their respective positions on the virtual z axis. Thus, layers provide a technique for representing the relative location of objects within this imagined z dimension.

Group: In addition to its plain or ordinary meaning, a group refers to a logical collection of one or more objects, which may themselves be shapes or images or other groups. The use of groups allows objects to be arranged in a recursive structure. For purposes of the present disclosure, the term child refers to objects contained within a group, which may comprise another group or any other object such as a graphical shape.

Duplicates: According to one embodiment of the present disclosure, each object may be associated with various attributes including, for example, a name and a type. As designers/animators may sometimes utilize the same names and types for multiple objects, a common scenario that arises in performing a matching process involves the identification and elimination of duplicates. Thus, in addition to its plain meaning, the term duplicates refers to at least two second objects that are associated with a first object by virtue of one or more common attributes.

Methodology and Architecture

FIG. 1a is a high-level flowchart for performing an animation shape matching process according to one embodiment of the present disclosure. According to one embodiment of the present disclosure, a designer or animator may work first in a design phase in which the animator designs multiple artboards, wherein each artboard represents a temporal point in an animation process. Each artboard is associated with a set of objects, which may comprise graphical objects or groups of graphical objects. Further, shapes may be arranged in layers, whereby due to their position in the layer hierarchy, shapes may occlude other shapes. According to one embodiment of the present disclosure, once an animator has designed a set of artboards, the animator may invoke an automated animation process, which may further invoke an animation shape matching process for associating shapes between the multiple artboards in order to carry out an automated animation. It will be further understood that each object in artboard is associated with a set of attributes which may include a name, a type, a color, a shape, etc.

Referring now to FIG. 1a, the process is initiated in 170. In 172, two artboards (artboard A 120(1) and artboard B 120(2)) are received. Although the present description pertains to only two artboards by way of example, it will be understood that the process shown in FIG. 1a can be extended to an arbitrary number of artboards. In 174, it is determined whether there are any unexamined children in artboard A 120(1). As previously described, a child of an artboard may be an object which may be a graphical object or a group object. If there are no unexamined children in artboard A 120(1) ('No' branch of 174), the process ends in 184.

If there are unexamined children in artboard A 120(1) ('Yes' branch of 174), flow continues with 176 and a variable currentAChild is set to the next child in artboard A 120(1). In 178, any matches in artboard B 120(2) corresponding to currentAChild are determined. According to one embodiment of the present disclosure, a match may comprise an object in artboardB with one or more identical attributes to those of currentAChild. For example, according to one embodiment of the present disclosure a match between two objects may comprise two objects with the same name and type. According to one embodiment of the present disclosure, an animator may provide a name for each node/object defined on an artboard. The type attribute may comprise, for example, the type of shape or whether the object is a group.

In 180, all of the matches determined in 178 are ranked by computing a distance metric as a function of the associated attributes of currentAChild and all of the matching objects determined in 178. According to one embodiment of the present disclosure, the following property attributes may be utilized: position, size, fill color, stroke color, visibility, corner radius, line height, character spacing, and font size. These attributes are only examples and any other attributes are possible. The relative layer distance of each object may be computed by comparing the indices of each object in artboard A 120(1) and artboard B 120(2). According to one embodiment of the present disclosure, a Euclidean or other metric may be utilized, for example, by computing the sum of the squares of the differences of the attributes of currentAChild with respect to each of the matching objects determined in 178. If it is a layer attribute, the absolute value of the difference between the layer indices may be used. In 182, the highest ranked match (i.e., match with smallest distance) is selected. Flow then continues with 174.

Figure 1B:
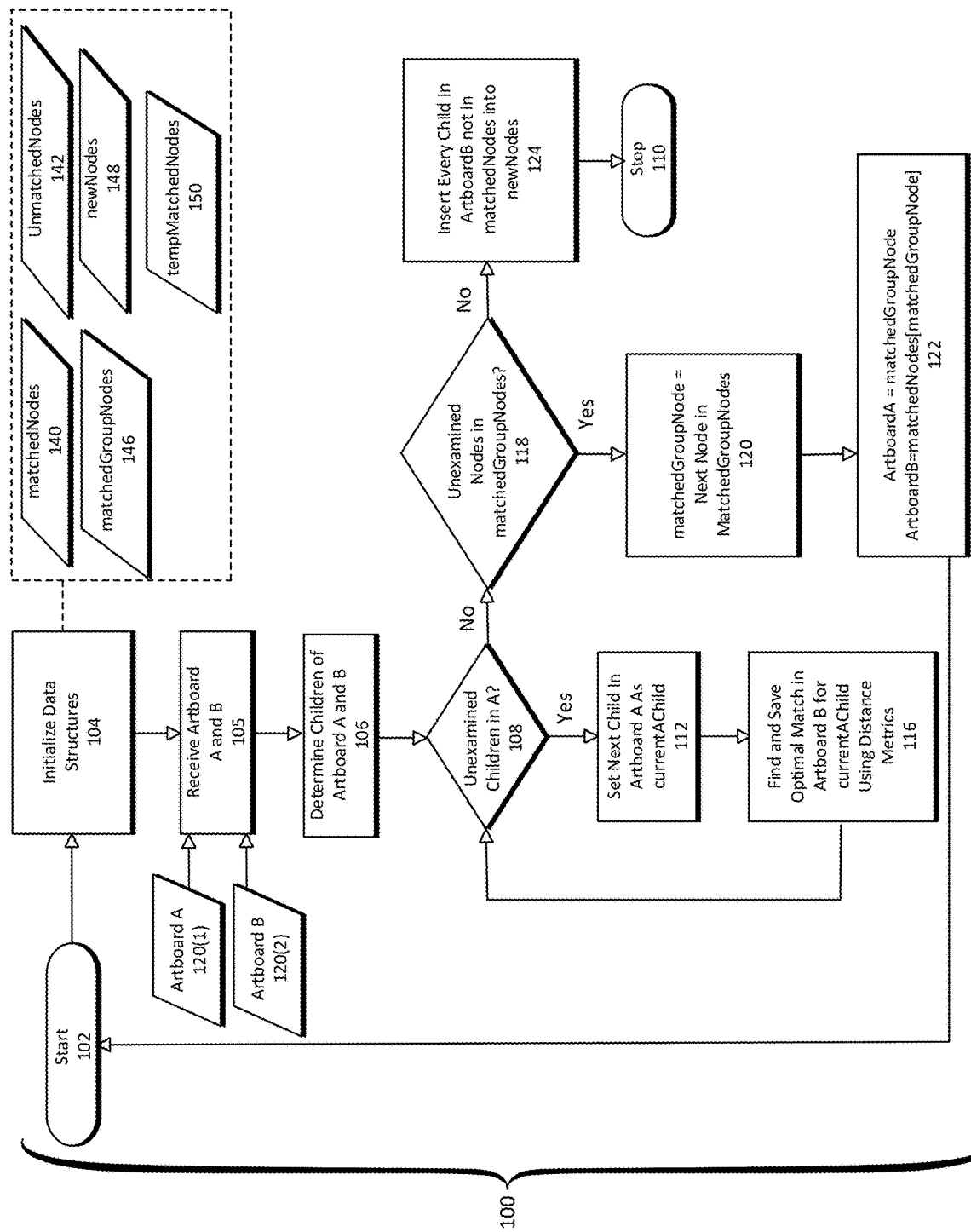
FIG. 1b is a more detailed flowchart of an animation shape matching process according to one embodiment of the present disclosure.

FIG. 1b is a detailed flowchart of an animation shape matching process according to one embodiment of the present disclosure. For purposes of the present discussion, similar to the discussion with respect to FIG. 1a, it is assumed that an automated animation is to be performed with respect to two artboards, herein referred to as artboard A 120(1) and artboard B 120(2). Each artboard 120 may be associated with one or more objects. The associated objects may comprise groups, which themselves may be associated with one or more objects, which may be groups, thereby generating a hierarchical relationship between objects. To perform an automated animation with respect to artboard A 120(1) and artboard B 120(2), a matching process is performed wherein each object in artboard A 120(1) is associated with a respective object in artboard B 120(2), if possible. To effectively perform this matching, a process to eliminate duplicates is performed. As previously mentioned, duplicates may arise due to the use of identical names/types for multiple objects.

Referring now to FIG. 1b, animation shape matching process 100 is initiated in 102. In 104, various data structures are initialized. As shown in the dashed box of FIG. 1a, according to one embodiment of the present disclosure, a map (dictionary) data structure matchedNodes 140 is created and initialized. List data structures unMatchedNodes 142, newNodes 148, tempMatchedNodes 150 and matchedGroupNodes 146 are also created and initialized. The behavior of a dictionary data structure and list data structure is well understood and will not be discussed further herein. However, for purposes of the present discussion, matchedNodes 140 stores an association between nodes or objects in a first artboard (artboard A) 120(1) and nodes or objects in a second artboard (artboard B) 120(2). unMatchedNodes 142 is a list data structure that stores a list of unmatched nodes. tempMatchedNodes 150 is a list data structure that stores a ranked list of matched nodes in a second artboard with respect to a node/object in a first artboard. According to one embodiment of the present disclosure, the ranking of tempMatchedNodes may be performed by applying one or more distance metrics described below. matchedGroupNodes 146 stores a list of group objects that have been matched in a second artboard to respective objects in a first artboard. newNodes 148 stores a list of objects that only exist in the second artboard, not the first artboard.

In 105, artboard A 120(1) and artboard B 120(2) are received. In 106, all children of artboard A 120(1) and artboard B 120(2) are determined. In particular, as previously noted, objects may be arranged in an artboard in a hierarchical fashion whereby groups contain objects, which themselves may be groups thereby providing a hierarchical or layered approach for the arrangement of objects/nodes.

As will be described, the children of artboard A 120(1) determined in 106 are now examined in a sequential fashion.

In particular, in 108, it is determined whether there are any unexamined children in artboard A 120(1). If so ('Yes' branch of 108), in 112, a variable currentAChild is set to the next child in artboard A 120(1). According to one embodiment of the present disclosure, object identified by currentAChild will be utilized to attempt to determine an optimal match in artboard B 120(2). In 116, an optimal match in artboard B 120(2), if one exists, for the currentAChild in artboard A 120(1) is determined by calculating a distance metric between currentAChild and each child of artboard B 120(2). As will be described in more detail with respect to FIG. 1b, determination of an optimal match in artboard B 120(2) may require the elimination of duplicate child objects in artboard B 120(2) that may share the same name and type as currentAChild. As will be described in more detail with respect to FIG. 1b, upon completion of 118, matchedNodes 140 is updated for any matched nodes in artboard B 120(2) corresponding to the currentAChild. Similarly, matchedGroupNodes 146 is also updated to include any group nodes that match currentAChild if it in fact is a group. Further, unmatchedNodes 142 is updated to include any unmatched nodes. Flow then continues with 108 where it is determined whether any unexamined children exist in artboard A 120(1).

If all children in artboard A 120(1) have been examined ('No' branch of 108), flow continues with 118 where it is determined whether any unexamined nodes/objects exist in matchedGroupNodes 146. As will be described with respect to FIG. 1b, matchedGroupNodes 146 is a list that stores group objects that have been matched according to the process shown in FIG. 1b (118). If there are no unexamined nodes/objects in matchedGroupNodes 146 ('No' branch of 118), flow continues with 124 where every child in artboard B 120(2) that is not in matchedNodes 140 is inserted into newNodes 148. If there are unexamined objects/node in matchedGroupNodes 146, flow continues with 120 where a variable matchedGroupNode is set to the next node in matchedGroupNodes 146. Then in 122, a recursion step is initialized by setting the current artboard A 120(1) to matchedGroupNode and artboard B 120(2) is set to the value of the key in matchedNodes 140 corresponding to the key matchedGroupNode. Flow then continues with 102 where a recursive operation is performed.

Figure 1C:
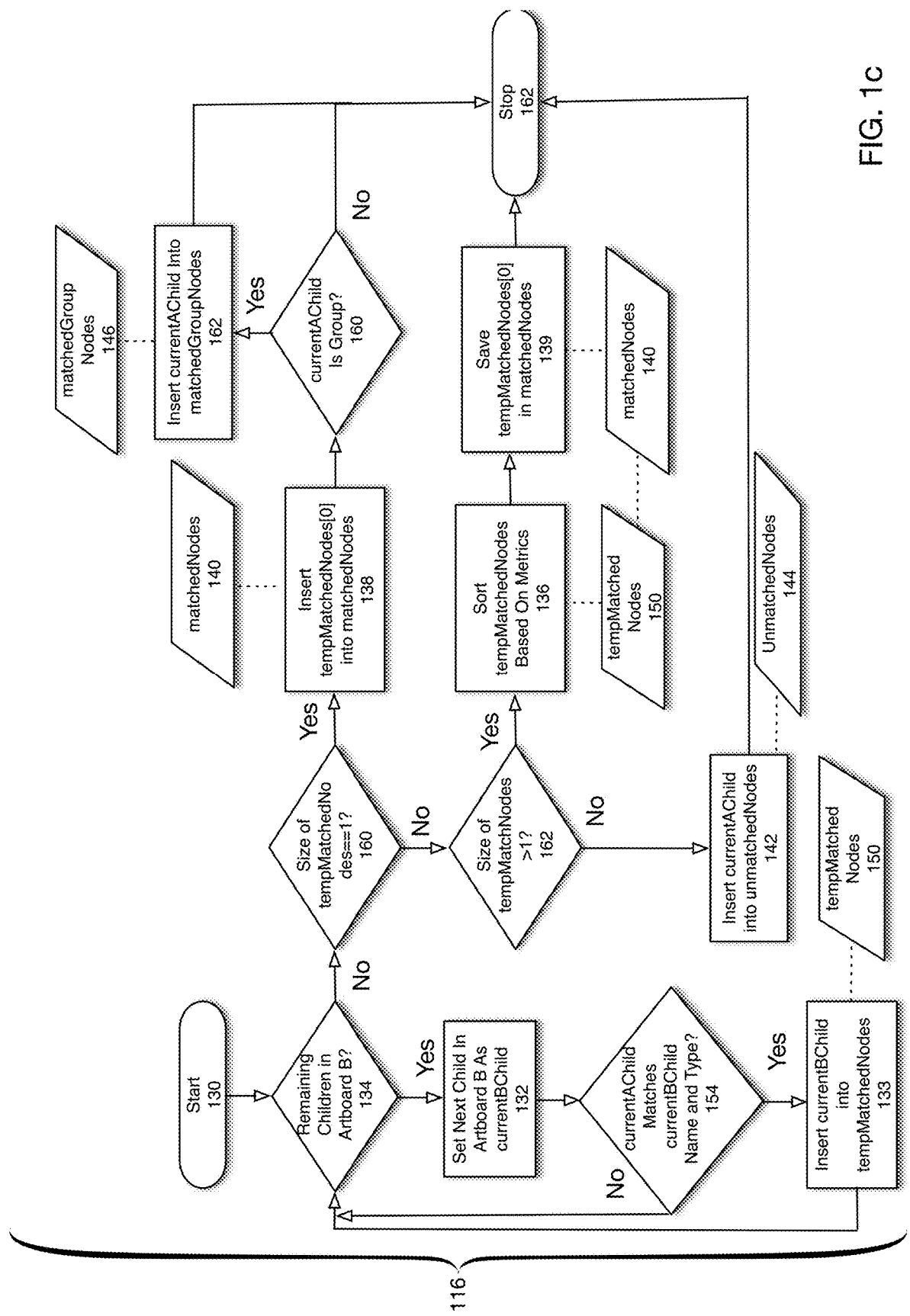
FIG. 1c is a flowchart of a process for determining an optimal match for an object in a first artboard with respect to a plurality of objects in a second artboard according to one embodiment of the present disclosure.

FIG. 1c is a flowchart of a process for determining an optimal match for an object in a first artboard with respect to a plurality of objects in a second artboard according to one embodiment of the present disclosure. As previously described with respect to FIG. 1b, the process shown in FIG. 1c operates to determine an optimal match for a current child in artboard A 120(1) (currentAChild) and updates various state variables. The process is initiated in 130. In 134, it is determined whether there exist any remaining children in artboard B 120(2). If so ('Yes' branch of 134), in 132, a variable currentBChild is set to the next child in artboard B 120(2). In 154, it is determined whether the object identified by the variable currentAChild matches the object identified by currentBChild. According to one embodiment of the present disclosure, a match between an object in artboard A 120(1) and artboard B 120(2) is registered if at least the objects share the same name. According to an alternative embodiment, a match is registered if the corresponding objects share both the same name and same type. According to alternative embodiments, any attributes or combination of attributes associated with objects in artboard A 120(1) and artboard B 120(2) may be utilized to determine whether a match exists. If no match is detected ('No' branch of 154), flow continues with 134 where remaining children in artboard B 120(2) are examined. If a match is detected ('Yes' branch of 154, flow continues with 133 where the node identified by currentBChild is inserted into tempMatchedNodes 150. The list variable tempMatchedNodes is utilized to keep a running list of matching objects/nodes from artboard B 120(2) corresponding to the currentAChild. Flow continues with 134 where it is determined whether there exist any remaining children in artboard B 120(2).

If there are no remaining children in artboard B 120(2) ('No' branch of 134), flow continues with 160 where the size of tempMatchedNodes 150 is determined. As previously noted, tempMatchedNodes 150 stores nodes from artboard B 120(2) that match currentAChild with respect to one or more attributes such as name and type. If the size of tempMatchedNodes 150 is 1, it indicates that a single match has been detected (i.e., no duplicates exist) and flow continues with 138 where the first entry in tempMatchedNodes (tempMatchedNodes[0]), which should be the only node, is inserted in the list variable matchedNodes 140. Flow continues with 160, where it is determined whether currentAChild is a group node. If currentAChild is a group node and a match with currentBChild has been detected, it implies that currentBChild is also a group node since according to some embodiments the nodes must match in their type attributes. If currentAChild is not a group node ('No' branch of 160), flow continues with 162 and the process ends. Otherwise ('Yes' branch of 160), flow continues with 162 where the node identified by currentAChild is inserted into the dictionary/map matchedGroupNodes 146. According to one embodiment of the present disclosure, the key value is an identifier of currentAChild and the value is an identifier of currentBChild. Flow then continues with 162 and the process ends.

If the size of tempMatchedNodes does not equal 1, ('No' branch of 160), flow continues with 162 where it determined whether the size of tempMatchedNodes is greater than 1. If not ('No' branch of 162), it implies that no matching nodes were found in artboard B 120(2) and flow continues with 142 where the node identified by currentAChild is inserted into the list structure unmatchedNodes 144. Flow then continues with 162 and the process ends.

If, on the other hand, the size of tempMatchedNodes is greater than 1 ('Yes' branch of 162), flow continues with 136 and tempMatchedNodes 150 is sorted based upon one or more metrics. According to one embodiment of the present disclosure, tempMatchedNodes is sorted based on the following criteria in descending order:
  (a) The number of properties that are similar. The following property values may be compared: position, size, fill color, stroke color, visibility, corner radius, line height, character spacing, and font size. Objects having a higher number of similar or matching properties can be listed higher on the list (more likely a match) than objects having a lower number of similar/matching properties.
  (b) The relative layer distance of each child. According to one embodiment of the present disclosure, layer distance is computed by examining the index of the child in artboard 120(1) in their parent and comparing that with the index of the child in artboard B. Objects having a smaller layer distance difference between them can be listed higher on the list (more likely a match) than objects having a larger layer distance difference between them.

Then, in 139, the first entry in tempMatchedNodes (tempMatchedNodes[0]) is saved in matchedNodes 140. as this represents an optimal match. The process then ends in 162.

Figure 2:
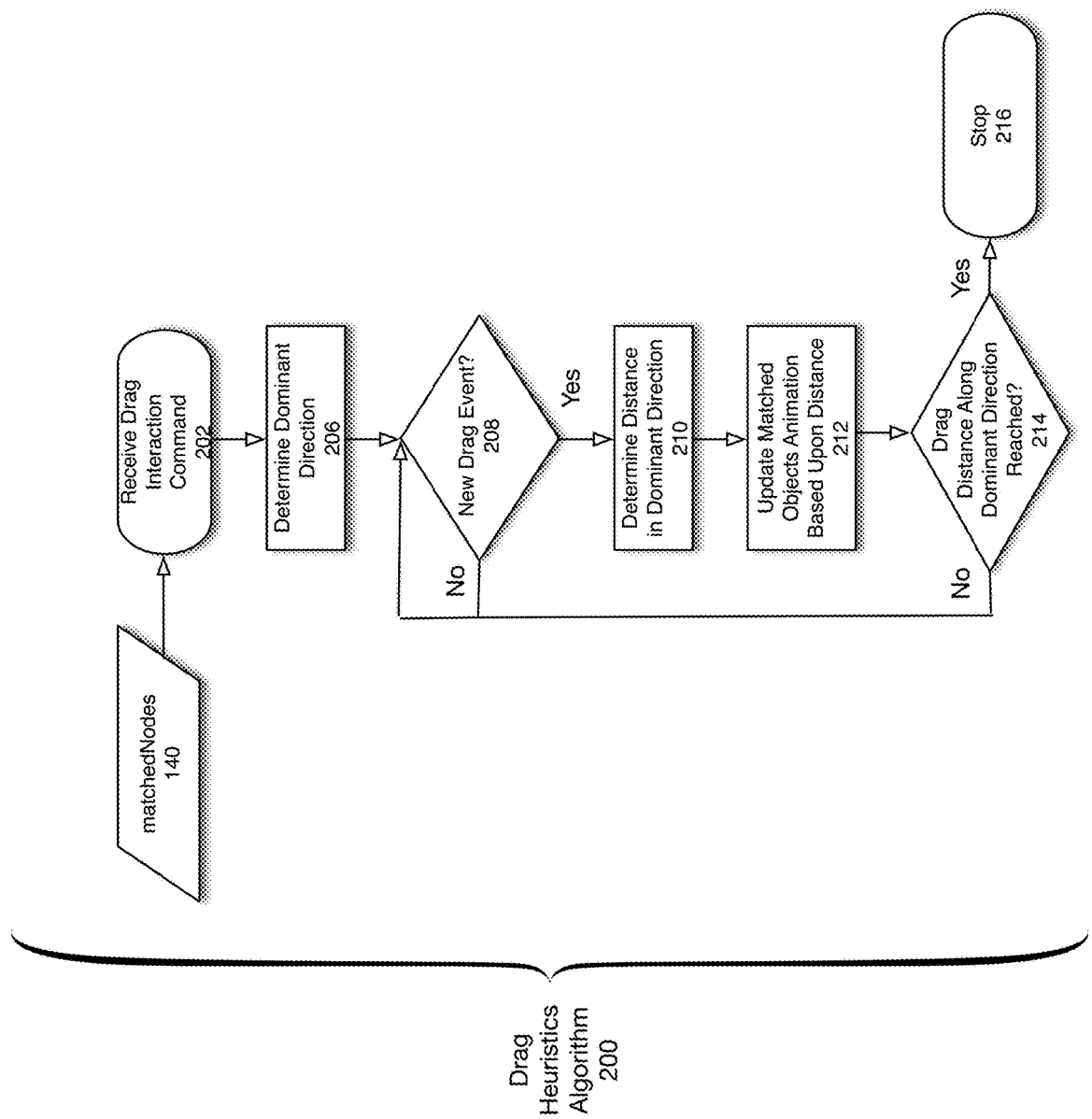
FIG. 2 is a flowchart of a process for performing drag heuristics according to one embodiment of the present disclosure.

FIG. 2 is a flowchart of a process for performing drag heuristics according to one embodiment of the present disclosure. As previously described, a drag heuristics process may be performed as part of a preview process in order to facilitate or enhance an animator's ability to preview a previously designed animation. According to one embodiment of the present disclosure, a drag heuristics process provides an automated ability for an animator to scrub a designed animation. The drag heuristics process 200 is initiated in 202 whereby a user indicates an intent to perform a drag heuristics interaction. In particular, according to one embodiment of the present disclosure, a matchedNodes object 140 is received. The matchedNodes object 140 was previously described and according to one embodiment of the present disclosure may comprise a dictionary or map wherein a key is an object identifier in a first artboard 120 and the value is an object identifier of a matching object in a second artboard 120.

In 206, a dominant direction is determined. An object may have moved in two dimensions in the X and Y plane. According to one embodiment of the present disclosure, a dominant drag direction may be determined as the greater of the distances the object moved in the X and Y dimensions. For example, if the object moved 10 units in the X dimension and 25 units in the Y dimension, the dominant direction would be in the Y direction. At this point in the process, a user may interact with the animation previewing operation using a device such as a mouse or a touch screen. In 208, it is determined whether a drag event is received. In particular, according to one embodiment of the present disclosure, a drag event may comprise a user's moving of a mouse or other input device (e.g., touch screen) along the determined dominant direction from 206. If no drag event is received ('No' branch of 208), flow continues with 208 and it is again determined whether a drag event is received. Otherwise ('Yes' branch of 208), in 210 a drag distance is determined in the dominant direction. For example, if the drag event moved 5 units in the X dimension and 2 units in the Y dimension and the dominant direction was in the Y dimensions, the distance would be determined as 2 units.

In 212, the matched objects to be animated are updated (i.e., animated) based upon the distance determined in 210. According to one embodiment of the present disclosure, a total drag distance may be defined based upon the sensitivity of the input device such as a mouse or touch screen. According to one embodiment of the present disclosure, the total drag distance may be the total number of units in the dominant direction the animated objects travel. The animation of the matched objects may then be updated based upon a ratio of the distance determined in 210 and the total drag distance and a scale factor to adjust to the sensitivity of the input device such as a mouse or touch screen. In other words, the animation may be updated in a fashion similar to updating the playhead of a playback machine such as a tape deck or VCR. In particular, the animator may "scrub" a virtual playhead to seek a different point in time in the animation. For example, if the drag is halfway and the animation is 1 second in duration, the playhead may move to 0.5 seconds into the animation. In 214, it is determined whether the total drag distance has been reached. If so ('Yes' branch of 214), the process ends in 216. Otherwise ('No' branch of 214), flow continues with 208.

Figure 3:
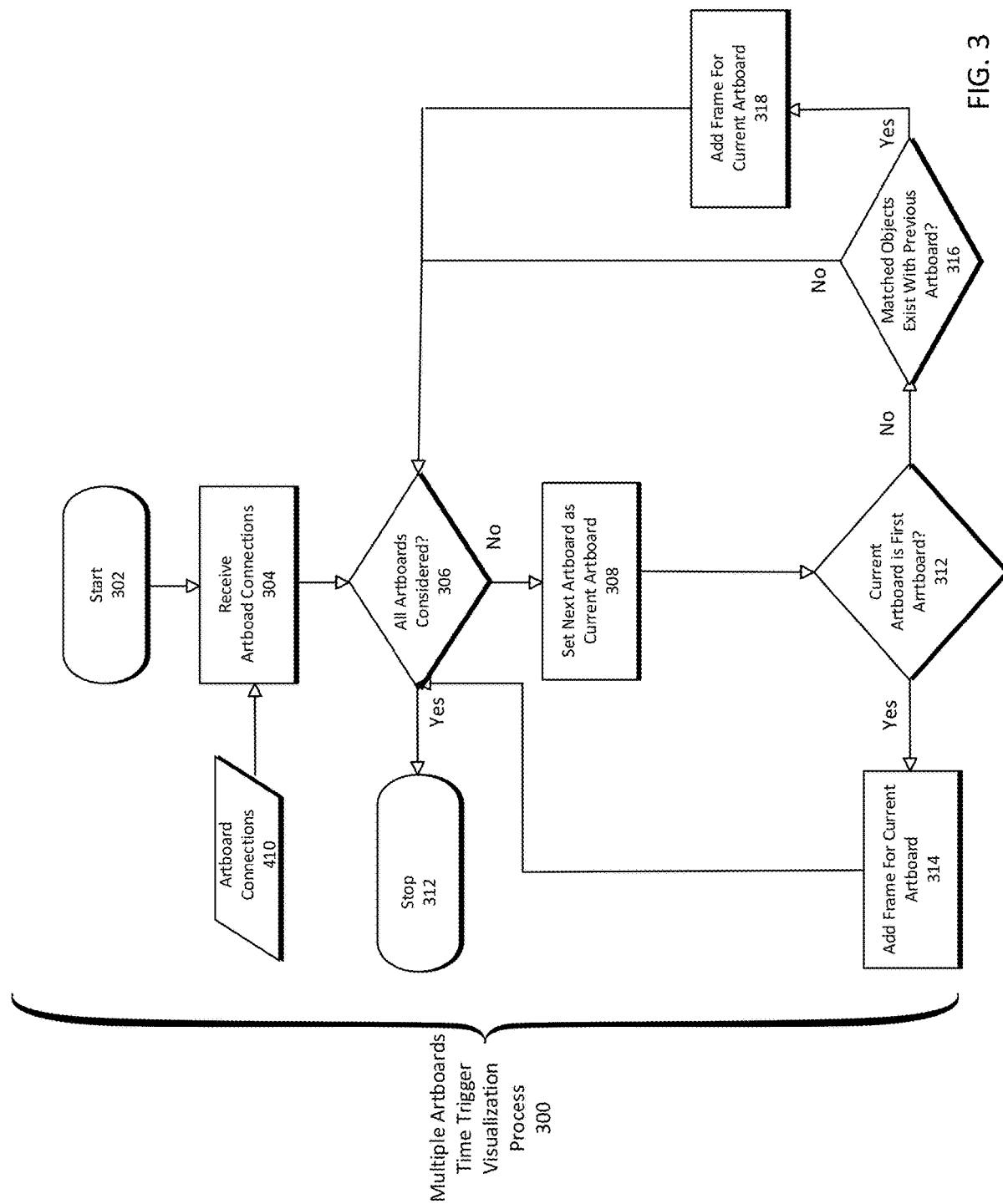
FIG. 3 is a flowchart depicting an operation of a time trigger visualization process according to one embodiment of the present disclosure.

FIG. 3 is a flowchart depicting an operation of a time trigger visualization process according to one embodiment of the present disclosure. The process shown in FIG. 3 may be implemented on a time trigger module 416 as described below with respect to FIG. 4. As previously described, a time trigger process allows an animator to create a temporal sequence of multiple artboards that are treated as a single artboard for animation purposes where time operates as a triggering event between the animation from one artboard to the next. In order to facilitate such functionality, according to one embodiment of the present disclosure, a GUI provides a visual tool to allow an animator to link multiple artboards in a temporal sequence. Further, a time trigger visualization process may apply one or more heuristics to determine whether to include particular artboards within a temporal sequence. The process depicted in the flowchart shown in FIG. 3 pertains to the operation of a GUI that allows an animator to generate a temporal sequence of multiple artboards.

Referring now to FIG. 3, the process is initiated in 302. In 304, artboard connections 410 are received. According to one embodiment of the present disclosure, a user may utilize a linking indicator (described below with respect to FIGS. 8a-8c) to indicate the linking of multiple artboards. In 306, it is determined whether all artboards have been considered. If so ('Yes' branch of 306), the process ends in 312. Otherwise ('No' branch of 306), flow continues with 308 wherein the next artboard is set as the current artboard. In 312 it is determined whether the current artboard is the first artboard in the sequence. If so ('Yes' branch of 312), in 314 a frame is added for the current artboard. Otherwise ('No' branch of 312), in 316 it is determined whether there exist matched objects between the previous artboard and the current artboard, for example using animation matching process 100. If not ('No' branch of 316), flow continues with 306. Otherwise ('Yes' branch of 316), flow continues with 318 whereby a frame is added for the current artboard. Flow then resumes with 306.

Figure 4:
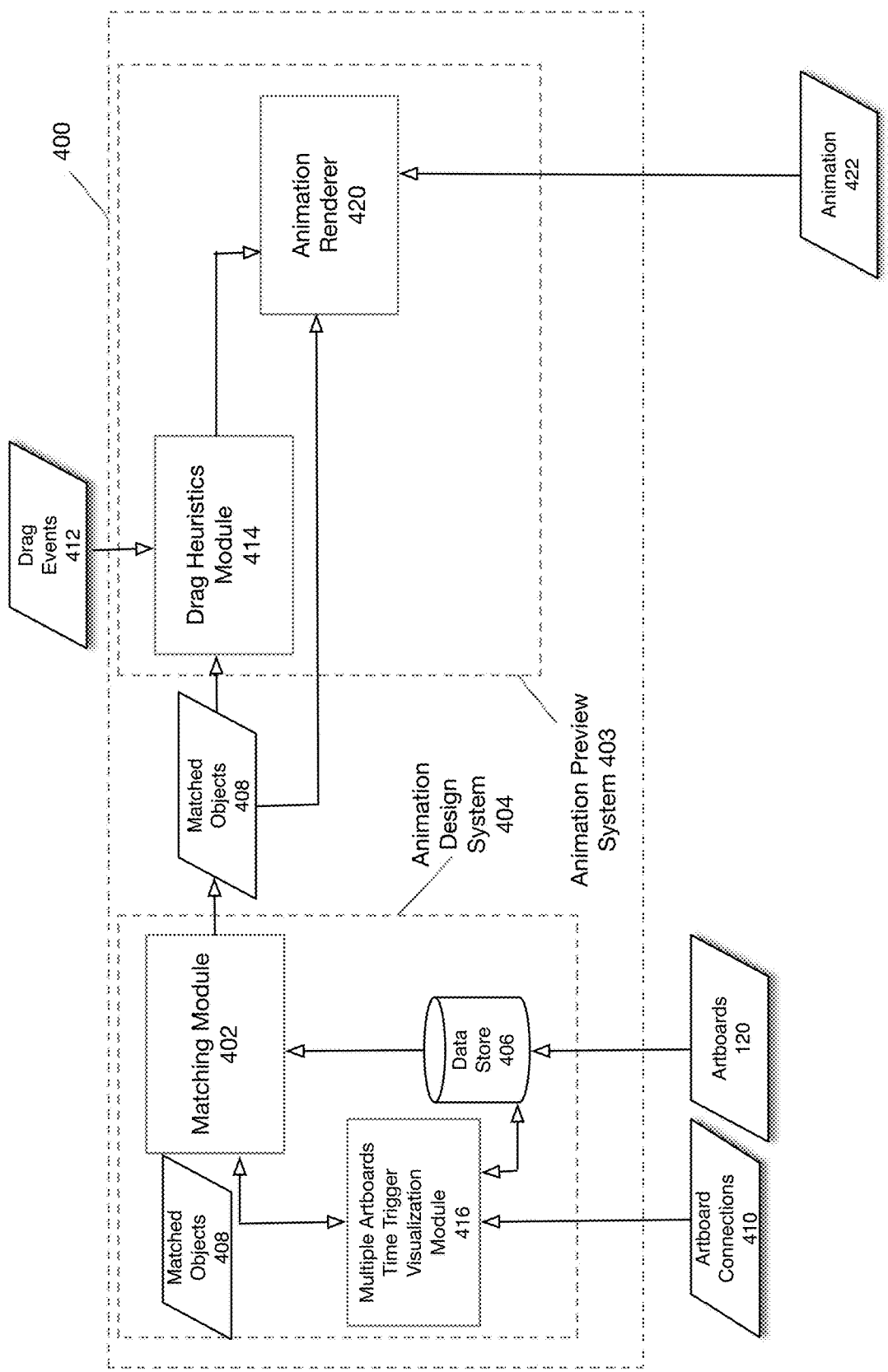
FIG. 4 is a block diagram of an animation system according to one embodiment of the present disclosure.

FIG. 4 is a block diagram of an animation system according to one embodiment of the present disclosure. As shown in FIG. 4, animation system further comprises animation design system 404 and animation preview system 402. An animator or designer may utilize animation design system 404 to design an arbitrary animation comprising any number of artboards. Once an animation has been designed using animation design system 404, an animator may utilize animation preview system 403 to preview the animation and evaluate its effects. As shown in FIG. 4, animation design system 404 further comprises matching module 402, multiple artboards time trigger visualization module 416 and data store 406. Matching module 402 may perform an animation matching process 100 as described with reference to FIGS. 1a-1c. In particular, artboards 120 may be received by animation design system 404 and stored in data store 210. Matching module 402 may retrieve artboards 120 from datastore 406 and perform an animation matching process 100 to generate matched objects 408.

The operation of multiple artboards time trigger visualization module 416 will now be described. According to one embodiment of the present disclosure, multiple artboards time trigger visual module 416 performs a visualization process and provides controls for animation rendering of multiple artboards arranged in a temporal sequence. As shown in FIG. 4, multiple artboards time trigger visualization module 416 receives artboard connections 410, which indicate particular artboards 120 to be linked together in a sequential fashion to provide a seamless animation. Multiple artboards time trigger visualization module 416 may submit information regarding particular artboards 120 under consideration to matching module 420 and in turn receive matching information such as matched objects 408 from matching module 420.

Once a designer has completed an animation design, the designer may utilize animation preview system 403 to preview the animation. As shown in FIG. 4, animation preview system 403 further comprises drag heuristics module 414 and animation renderer 420. Drag heuristics module performs a drag heuristics process 200 as described with reference to FIG. 2. Animator renderer 420 receives matched objects 408 and output from drag heuristics module to render animation 422.

The operation of drag heuristics module 414 will now be described. As shown in FIG. 4, matched objects 408 and drag events 412 are received by drag heuristics module 414. Drag events 412 may comprise, for example, a mouse-based event or a touch screen based event (e.g., swipe or drag gesture on touch screen) or other input device drag events. Matched objects 408 as previously described comprise objects from artboards 120 that have been matched using animation shape matching process 100.

Figure 5:
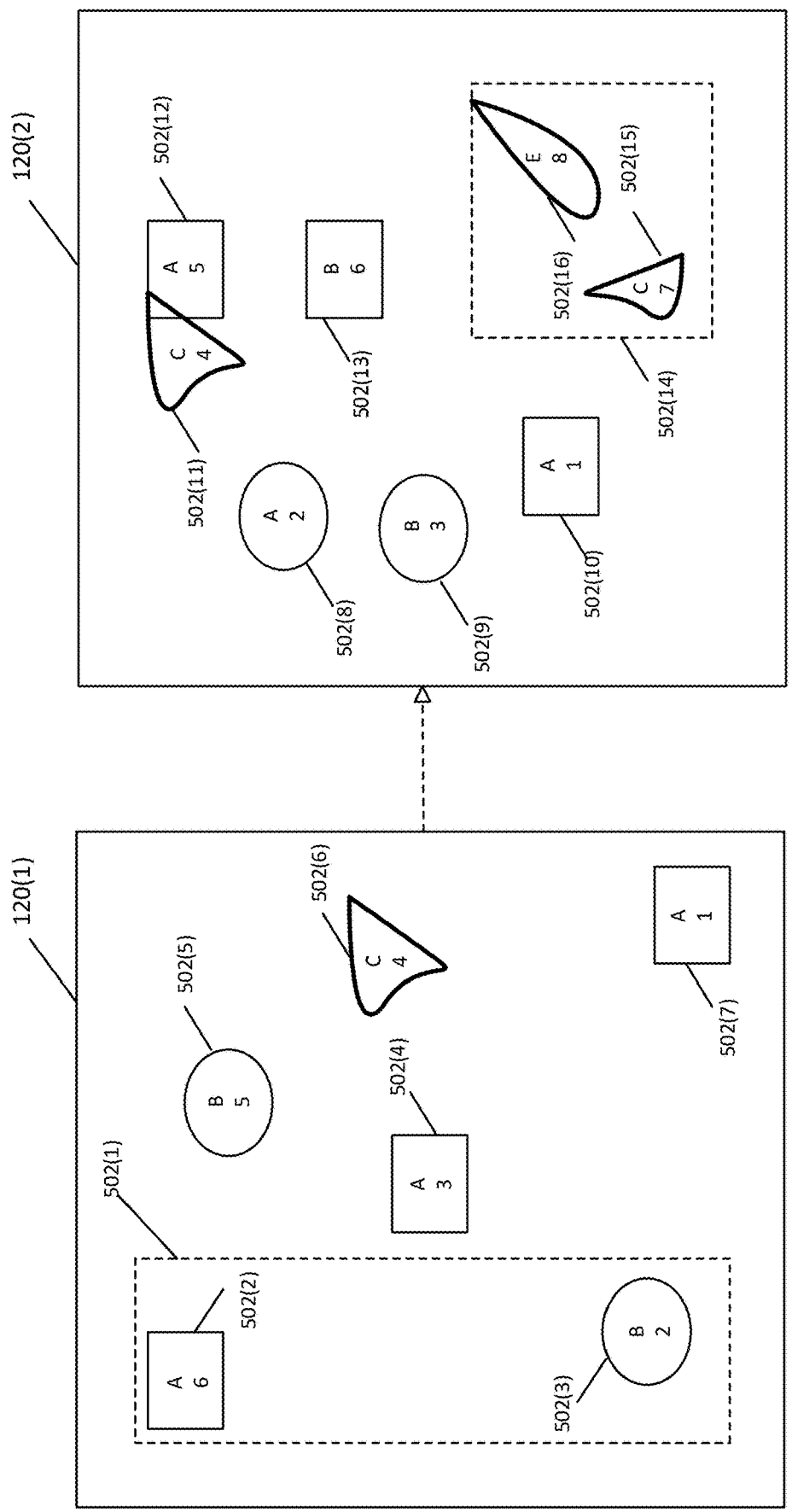
FIG. 5 illustrates various aspects of a matching process according to one embodiment to the present disclosure.

FIG. 5 illustrates various aspects of a matching process according to one embodiment to the present disclosure. In particular, FIG. 5 depicts a scenario to which animation matching process 100 may be applied. As shown in FIG. 5, two artboards 120(1) and 120(2) are presented each associated with respect child objects 502(1)-502(7) and 502(8)-502(16). A name attribute and a layer index attribute are shown with respect to each object 502. For example, object 502(2) has a name 'A' and layer index 6. A type attribute may also be inferred from the shape of the objects shown in FIG. 5. For example, object 502(2) is of the same type as object 502(10) because they are both rectangular. Further, group objects (e.g., 502(1) and 502(14)) are indicated by dashed boxes. A distance attribute between objects may be inferred as the two-dimensional distance between objects shown in the drawing. It is assumed that each object 502 shown in FIG. 5 may be associated with an arbitrary number of other attributes not explicitly depicted therein.

For purposes of the present example, assume the other attributes used for matching are layer index and distance. Further, assume that a match is to be determined for object 502(4) using animation matching process 100. Because 502(4) is a square type with name "A", the candidate matches are 502(12) and 502(10). In order to determine the optimal match, the layer index and distance between 502(4) and both 502(10) and 502(12) require evaluation. Using a Euclidean metric, the optimal match may be expressed as:

$$\min_i (ld_i - 3)^2 + (x_i - x)^2 + (y_i - y)^2$$

where x and y are the respective coordinates of 502(4), $ld_i$ is the layer index of the $i^{th}$ child object in artboard 120(2) and $x_i$ and $y_i$ are the respective x and y coordinates of the $i^{th}$ child object in artboard 120(2). Although the example in FIG. 5 only utilizes two attributes (layer index and distance), according to alternative embodiments any number of attributes may be utilized.

FIG. 6a depicts an example operation of a drag heuristics process according to one embodiment of the present disclosure. For purposes of this example, assume that object 502 in artboard 120(1) is to be animated. Because the object 502 clearly moves a larger distance in the x direction, the x direction is the dominant direction. In particular, the determination of a dominant direction may be achieved by comparing the absolute value of the distance moved in the x and y dimensions as follows:

If |xd|>|yd|, then x is the dominant direction.

Otherwise y is the dominant direction.

According to some embodiments, the layer index between two objects is treated separately from the spatial difference between two objects. Thus, for example, in determining an optimal match between an object in a first artboard and several objects in a second artboard, the spatial distances between the object in the first artboard and those in the second artboard may be determined first from which the objects in the second artboard may be sorted. Then, a layer index differential between the object in the first artboard and the objects in the second artboard may be determined and the list sorted based upon that differential while preserving the first sorting operation with respect to the spatial distances.

Figure 6B:
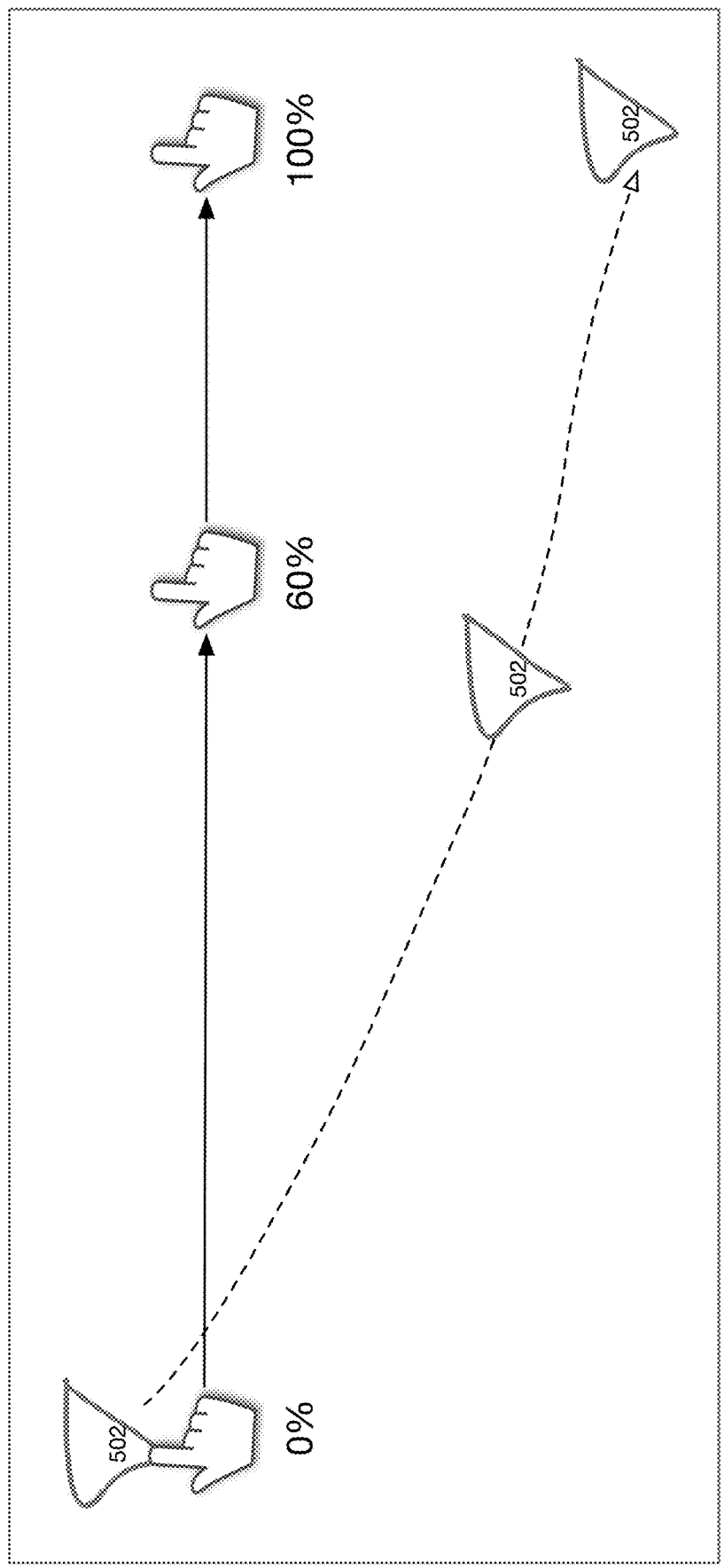
FIG. 6b depicts an example operation of a drag heuristics process upon determination of a dominant direction according to one embodiment of the present disclosure.

FIG. 6b depicts an example operation of a drag heuristics process upon determination of a dominant direction according to one embodiment of the present disclosure. Note that the object 502 moves in a southeast direction between artboard 120(1) and artboard 120(2). Because the dominant direction in this example is in the x direction, scrolling or scrubbing will be effectuated only in the x dimension as shown in FIG. 6b. In particular, a user may preview the animation by dragging on object 502, and the position of object 502 will update proportional to the distance dragged horizontally from west to east by moving the animation playback head to the corresponding point in time. For instance, and according to one example embodiment, consider that object 502 moved in a southeast direction and the entire animation takes 1 second. When the user drags object 502 50% to the east, the system operates to move the animation playback head to 0.5 seconds. If the user drags back 25% to the west, the system operates to move the animation playback head to 0.25 seconds. The user can continue to drag back and forth until the mouse or finger is released.

Figure 7:
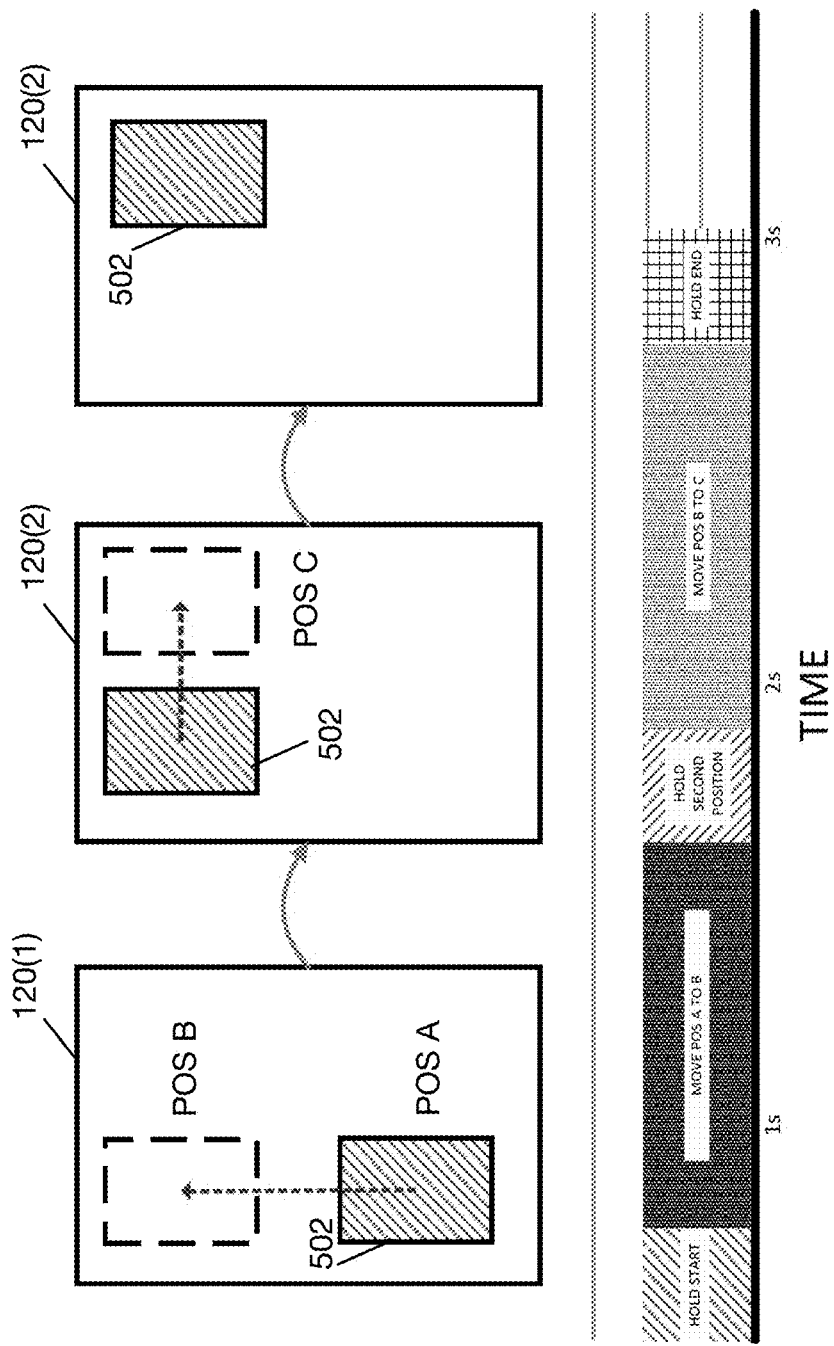
FIG. 7 depicts an example of a multiple artboards time trigger visualization process according to one embodiment of the present disclosure.

FIG. 7 depicts an example of a multiple artboards time trigger visualization process according to one embodiment of the present disclosure. As shown in FIG. 7, artboards 120(1), 120(2) and 120(3) may be linked together such that a single animation may be rendered. Note that object 502 shown in FIG. 7 moves vertically from POS A to POS B between artboards 120(1) and 120(2). However, object 502 moves horizontally from POS B to POS C between artboards 120(2) to 120(3). Thus, utilizing a time trigger visualization process, the combined vertical and horizontal motion between artboards 120(1)-120(3) may be rendered as an overall move to the northeast.

Figure 8A:
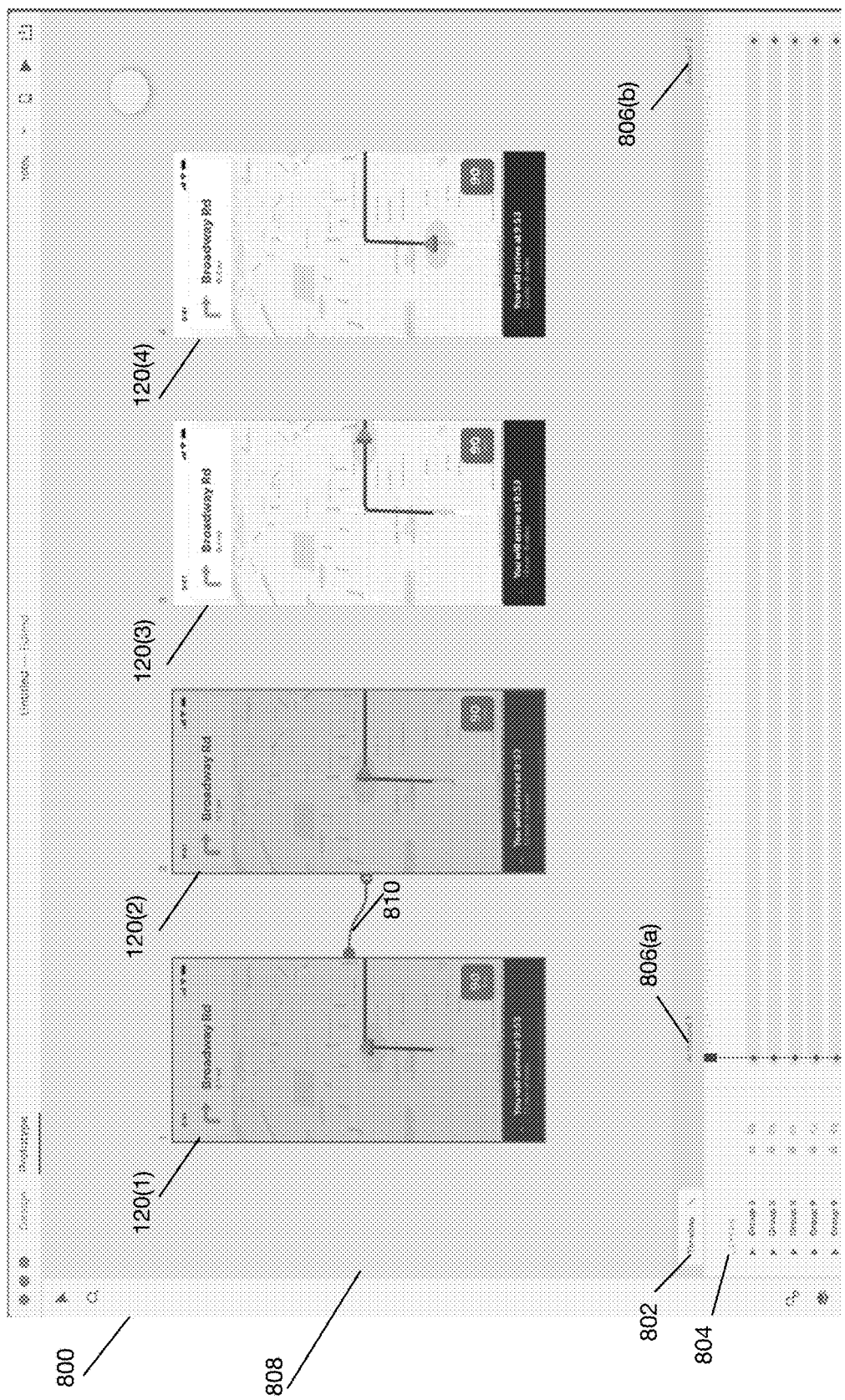
FIG. 8a shows an initial configuration of a user interface for generating a multiple artboards time-trigger animation according to one embodiment of the present disclosure.

FIGS. 8a-8d show a user interface and example scenario for generating a multiple artboards time-trigger animation according to one embodiment of the present disclosure. FIG. 8a shows an initial configuration of a user interface for generating a multiple artboards time-trigger animation according to one embodiment of the present disclosure. As shown in FIG. 8a, a user may interact with a main window 800 which further comprises an artboard linking pane 808, timeline 802 and layer pane 804. As shown in FIG. 8a, four artboards 120(1)-120(4) are initially displayed in artboard linking pane 808. According to one embodiment of the present disclosure, a user may drag or place one or more artboards in multiple artboard linking pane 808 in order to indicate the animator's desire to work with multiple artboards. When a time trigger is each of the artboards 120(1)-120(4) will auto-animate in sequence.

FIG. 8a also shows timeline pane 802, which further shows layer information 804. Timeline pane 802 provides a visual interface that allows an animator to work with multiple artboards as if they were a single artboard. Once the animator has selected multiple artboards to work with, the animator may then establish a temporal sequence between the selected artboards by linking them together using a visual linking indicator 810. For example, FIG. 8a shows that artboards 120(1) and 120(2) comprise a sequence indicated by the visual linking indicator 810 between them.

According to one embodiment of the present disclosure, a multiple time trigger visualization process 300 may apply one or more heuristics to determine which artboards should be added as frames in an animation sequence. In particular, if an animation can be accomplished between two different linked artboards (i.e., a matching algorithm determines at least one matched object 502 between the artboards 120), both artboards 120 will appear in the timeline pane 802 as respective frames 806. That is, each artboard rather than existing as a disparate component becomes a frame in a temporal sequence if it makes sense to do so (i.e., there are matching objects with respect to other artboards in the sequence). According to the example shown in FIG. 8a, a user has selected two of the artboards (120(1) and 120(2)) and linked them together as indicated by linking indicator 810, which indicates to the system that a time trigger is to be established between artboards 120(1) and 120(2). Accordingly, timeline pane 802 automatically shows corresponding frames 808(a) and 806(b) corresponding to respective artboards 120(1) and 120(2).

As currently shown in FIG. 8a, because a linking has between established between the two artboards 120(1) and 120(2), an automatic animation could be initiated between those two artboards 120. Accordingly, once a designer has indicated a desire to start an automatic animation, an animation matching process 100 would be initiated to determine matching objects between artboard 120(1) and 120(2) followed by a rendering of the animation. Had a designer indicated a linking between artboards 120(1), 120(2), 120(3) and 120(4), these artboards would be treated as a single artboard if possible.

Figure 8B:
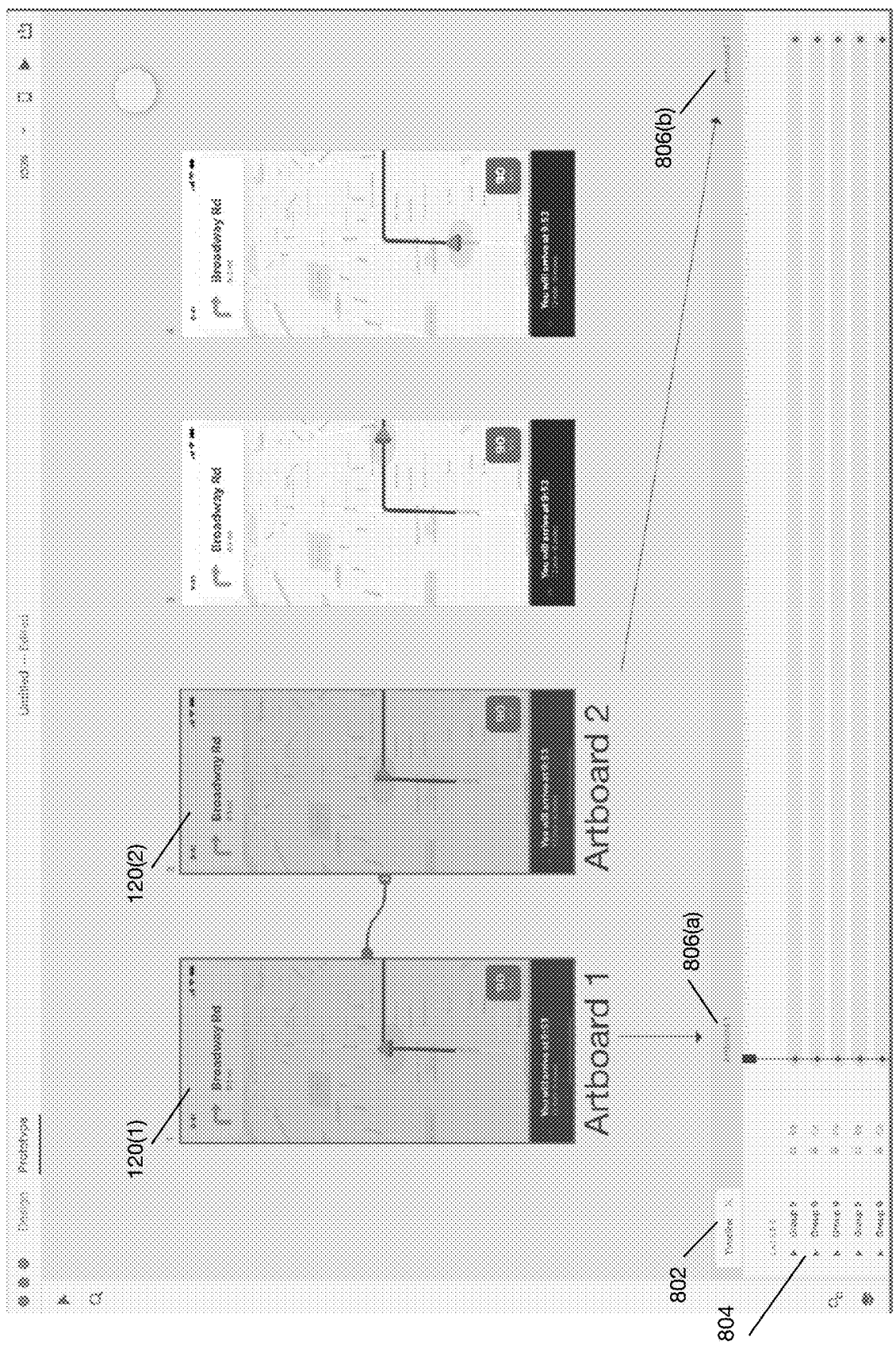
FIG. 8b shows a configuration of a user interface for generating a multiple artboards time-trigger animation explicitly indicating the relationship between artboards and frames according to one embodiment of the present disclosure.

FIG. 8b shows a configuration of a user interface for generating a multiple artboards time-trigger animation explicitly indicating the relationship between artboards and frames according to one embodiment of the present disclosure. In particular, as shown in FIG. 8b, artboards 120(1) and 120(2) are explicitly represented as frames 806(a) and 806(b) in timeline 802 respectively.

Figure 8C:
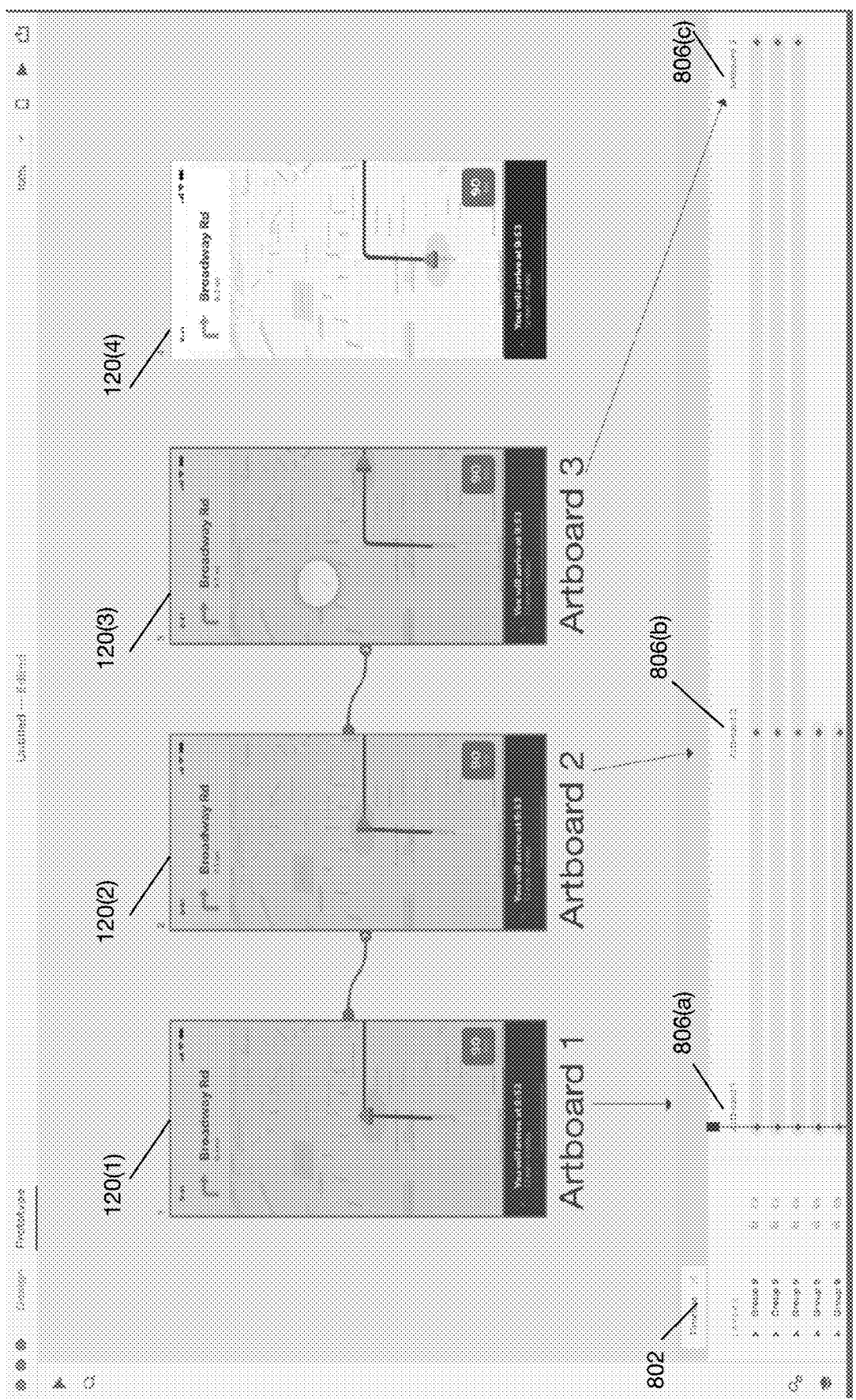
FIG. 8c shows a configuration of a user interface for generating a multiple artboards time-trigger animation explicitly indicating the relationship between artboards and frames according to one embodiment of the present disclosure.

FIG. 8c shows a configuration of a user interface for generating a multiple artboards time-trigger animation explicitly indicating the relationship between artboards and frames according to one embodiment of the present disclosure. In particular, as shown in FIG. 8c, a third artboard 120(3) has been added and frame 806(c) has been generated automatically in timeline 802.

Figure 8D:
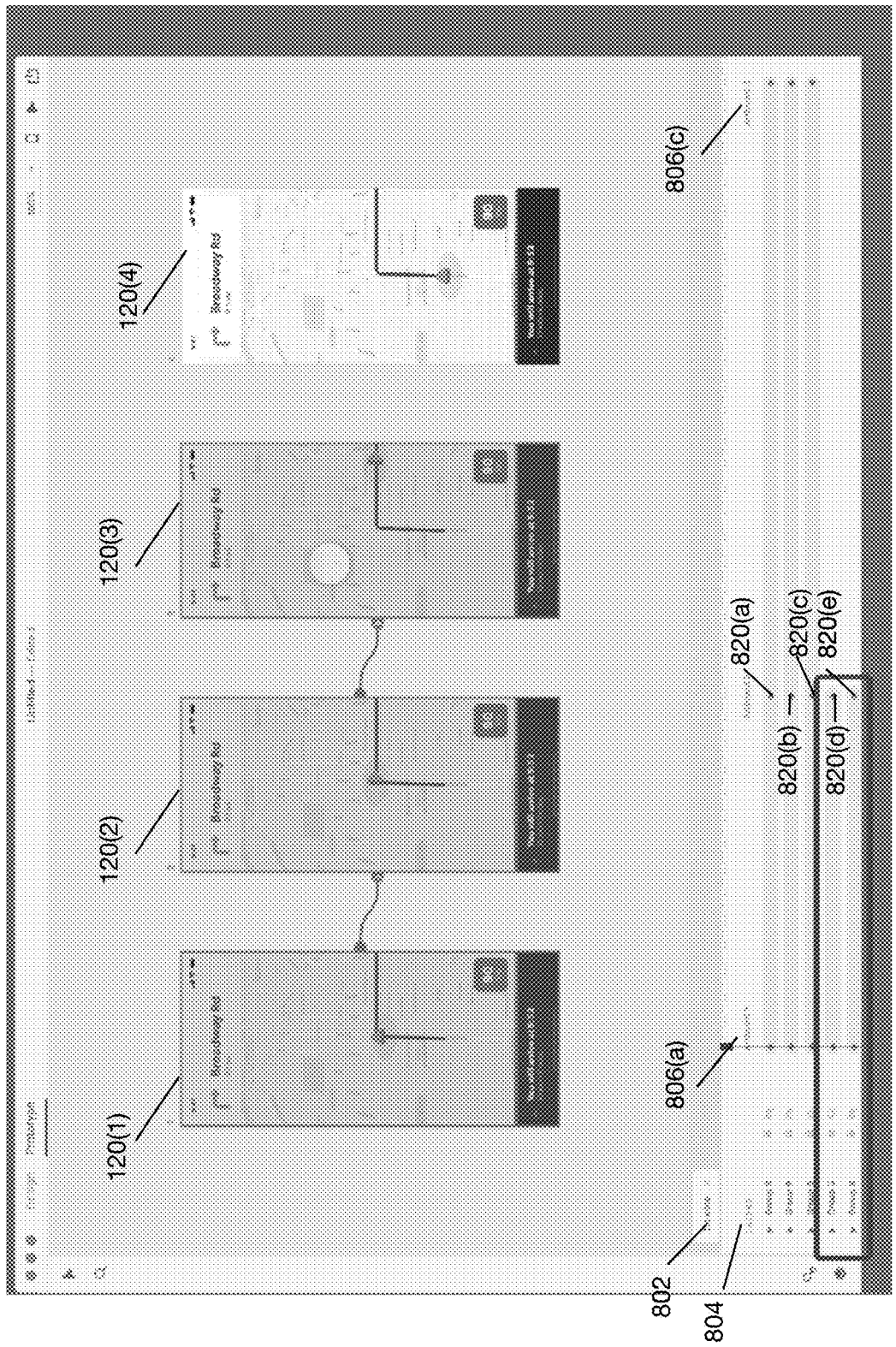
FIG. 8d shows a configuration of a user interface for generating a multiple artboards time-trigger animation according to one embodiment of the present disclosure.

FIG. 8d shows a configuration of a user interface for generating a multiple artboards time-trigger animation according to one embodiment of the present disclosure. In particular, as shown in FIG. 8d, a because the highlighted layers exist in artboard 120(1) but fade away in artboard 120(2), a transition will not be generated for artboard 120(3). Because the layer no longer exists in artboards 120(2), no transition will be represented on timeline 120 from artboard 120(2) to artboard 120(3).

Duration and sorting time controls 820(a)-820(e) may be manipulated to change the "duration" and "starting time" of the animation for each object. Because a single timeline for all three artboards is displayed, it is more intuitive to adjust these parameters in one place rather than by viewing similar UI between artboard 1 and artboard 2 and another UI for artboard 2 and artboard 3.

Integration in Computing System and Network Environment

Figure 9A:
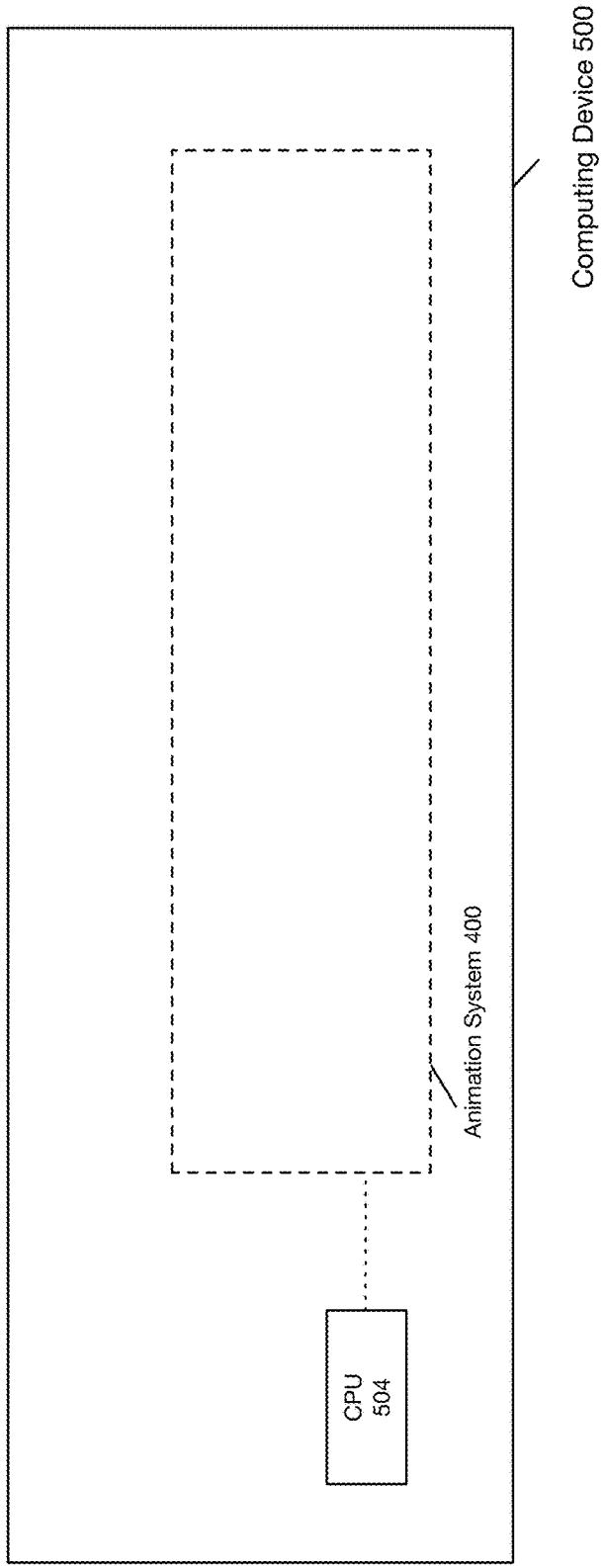
FIG. 9a illustrates an example computing system that executes an animation process according to one embodiment of the present disclosure.

FIG. 9a illustrates an example computing system that executes an animation process according to one embodiment of the present disclosure. As depicted in FIG. 9a, computing device 500 may include CPU 504 that executes one or more processes to execute animation system 400. In particular, CPU 504 may be further configured via programmatic instructions to execute animation system 400 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform. According to alternative embodiments CPU 504 may be replaced with a GPU.

FIG. 9b illustrates an example integration of an animation system into a network environment according to one embodiment of the present disclosure. As depicted in FIG. 9b, computing device 500 may be collocated in a cloud environment, data center, local area network ("LAN") etc. Computing device 500 shown in FIG. 9b is structured identically to the example embodiment described with respect to FIG. 9a. As shown in FIG. 9b, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any typical personal computing platform As will be further appreciated, computing device 500, whether the one shown in FIG. 9a or 65, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 510, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

Further Example Embodiments

The following examples pertain to further embodiments, from which numerous permutations and configurations will be apparent.

Example 1 is a method for performing animation. The method includes determining a first child object of a first artboard and second child objects of a second artboard. If a plurality of the second child objects match the first child object, the method further includes adding the plurality of second child objects to an initial list; sorting the initial list based upon at least one distance metric associated with the first child object and the plurality of second child objects to generate a sorted list, the at least one distance metric based upon at least one attribute associated with the first child object and the plurality of second child objects; and generating an association between the first child object and the second child object corresponding to a first entry in the sorted list. The method further includes rendering an animation using the association, the animation including the first child object and the second child object corresponding to the first entry in the sorted list.

Example 2 includes the subject matter of Example 1, wherein the at least one distance metric is based on layer distance attributes associated with the first child object and the plurality of second child objects, such that the sorting causes a first of the second child objects to be listed higher in the sorted list than a second of the second child objects, the first of the second child objects having a first number of layers by which it is separated from the first child object, and the second of the second child objects having a second number of layers by which it is separated from the first child object, the second number being larger than the first number. Note that the number of layers separating first and second child objects may be relative to layer 1 of a given layer hierarchy, or some other layer within that hierarchy. To this end, the number of layers by which one child object is separated from another child object can be computed in numerous ways, so long as layer differencing technique used is applied in a consistent manner, as will be appreciated in light of this disclosure.

Example 3 includes the subject matter of Example 1 or 2, wherein the at least one distance metric is based on the number of attributes associated with the first child object that match attributes associated with the plurality of second child objects, such that the sorting causes a first of the second child objects to be listed higher in the sorted list than a second of the second child objects, the first of the second child objects having a first number of matching attributes, and the second of the second child objects having a second number of matching attributes, the second number being smaller than the first number.

Example 4 includes the subject matter of any of the preceding Examples, wherein the at least one attribute includes one or more of position, size, fill color, stroke color, visibility, corner radius, line height, character spacing, and font size.

Example 5 includes the subject matter of any of the preceding Examples, and further includes: if the first entry in the sorted list is a group, recursing using the first entry in the sorted list and the first child object.

Example 6 includes the subject matter of Example 5, and further includes setting the first artboard to the first entry in the sorted list and the second artboard to an object associated with the first entry.

Example 7 includes the subject matter of Example 5 or 6, wherein rendering an animation includes animating at least one pair of matched objects.

Example 8 includes the subject matter of any of the preceding Examples, wherein a single one of the second child objects matches the first child object.

Example 9 includes the subject matter of any Example 8, wherein a match is determined if the first child object has a same name and type as the single one of the second child objects.

Example 10 is a method for previewing an animation, the method comprising: receiving a first object associated with a first artboard and a second object associated with a second artboard, wherein the first and second objects represent a single entity at a first time and a second time, respectively; determining a dominant direction of movement with respect to the first and second objects; receiving a drag event in the dominant direction; and updating an animation state of a visual representation of the entity in response to the drag event.

Example 11 includes the subject matter of Example 10, wherein the dominant direction is one of a horizontal direction or a vertical direction.

Example 12 includes the subject matter of Example 11, wherein the dominant direction is determined by selecting a direction associated with a largest absolute value in displacement of the entity between the first time and the second time.

Example 13 includes the subject matter of any of Examples 10 through 12, wherein the drag event is caused by a mouse movement.

Example 14 includes the subject matter of any of Examples 10 through 13, wherein prior to receiving the first and second objects, the method further includes determining that the first and second objects match one another with respect to a distance metric computed based on at least one attribute associated with both the first and second objects.

Example 15 includes the subject matter of Example 14, wherein the at least one attribute includes one or more of position, size, fill color, stroke color, visibility, corner radius, line height, character spacing, and font size.

Example 16 includes the subject matter of any of Examples 10 through 15, wherein updating an animation state further comprises rendering the entity on a graphical user interface to reflect an updated position.

Example 18 is a computer program product including one or more non-transitory machine-readable mediums encoded with instructions that when executed by one or more processors cause a process to be carried out for performing animation, the process comprising subject matter of any of Examples 1 through 9.

Example 19 is a computer program product including one or more non-transitory machine-readable mediums encoded with instructions that when executed by one or more processors cause a process to be carried out for previewing an animation, the process comprising subject matter of any of Examples 10 through 16.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for performing animation, the method comprising:
   determining, by a processor, a first child object of a first artboard and second child objects of a second artboard;
   identifying, by the processor, a plurality of the second child objects that match the first child object;
   adding, by the processor, the plurality of second child objects to an initial list;
   sorting, by the processor, the initial list based upon at least one distance metric associated with the first child object and the plurality of second child objects to generate a sorted list, the at least one distance metric based upon at least one attribute associated with the first child object and the plurality of second child objects;
   generating, by the processor, an association between the first child object and the second child object corresponding to a first entry in the sorted list; and
   rendering, by the processor, an animation using the association, the animation including the first child object and the second child object corresponding to the first entry in the sorted list.

2. The method of claim 1, wherein the at least one distance metric is based on layer distance attributes associated with the first child object and the plurality of second child objects, such that the sorting causes a first of the second child objects to be listed higher in the sorted list than a second of the second child objects, the first of the second child objects having a first number of layers by which it is separated from the first child object, and the second of the second child objects having a second number of layers by which it is separated from the first child object, the second number being larger than the first number.

3. The method of claim 1, wherein the at least one distance metric is based on the number of attributes associated with the first child object that match attributes associated with the plurality of second child objects, such that the sorting causes a first of the second child objects to be listed higher in the sorted list than a second of the second child objects, the first of the second child objects having a first number of matching attributes, and the second of the second child objects having a second number of matching attributes, the second number being smaller than the first number.

4. The method according to claim 1, wherein the at least one attribute includes one or more of position, size, fill color, stroke color, visibility, corner radius, line height, character spacing, and font size.

5. The method of claim 1, further comprising, if the first entry in the sorted list is a group, recursing using the first entry in the sorted list and the first child object.

6. A computer program product including one or more non-transitory machine-readable mediums encoded with instructions that when executed by one or more processors cause a process to be carried out for performing animation, the process comprising:
   determining a first child object of a first artboard and second child objects of a second artboard;
   if a plurality of the second child objects match the first child object
      adding the plurality of second child objects to an initial list,
      sorting the initial list based upon at least one distance metric associated with the first child object and the plurality of second child objects to generate a sorted list, the at least one distance metric based upon at least one attribute associated with the first child object and the plurality of second child objects, and
      generating an association between the first child object and the second child object corresponding to a first entry in the sorted list; and
   rendering an animation using the association, the animation including the first child object and the second child object corresponding to the first entry in the sorted list.

7. The computer program product of claim 6, wherein the at least one distance metric is based on layer distance attributes associated with the first child object and the plurality of second child objects, such that the sorting causes a first of the second child objects to be listed higher in the sorted list than a second of the second child objects, the first of the second child objects having a first number of layers by which it is separated from the first child object, and the second of the second child objects having a second number of layers by which it is separated from the first child object, the second number being larger than the first number.

8. The computer program product of claim 6, wherein the at least one distance metric is based on the number of attributes associated with the first child object that match attributes associated with the plurality of second child objects, such that the sorting causes a first of the second child objects to be listed higher in the sorted list than a second of the second child objects, the first of the second child objects having a first number of matching attributes, and the second of the second child objects having a second number of matching attributes, the second number being smaller than the first number.

9. The computer program product of claim 6, wherein the at least one attribute includes one or more of position, size, fill color, stroke color, visibility, corner radius, line height, character spacing, and font size.

10. The computer program product of claim 6, the process further comprising, if the first entry in the sorted list is a group, recursing using the first entry in the sorted list and the first child object.

* * * * *